(12) United States Patent
Kanade

(10) Patent No.: US 8,898,350 B2
(45) Date of Patent: Nov. 25, 2014

(54) MULTI-BUS ARCHITECTURE FOR MASS STORAGE SYSTEM-ON-CHIP CONTROLLERS

(75) Inventor: Ravindra K. Kanade, Austin, TX (US)

(73) Assignee: Spanison LLC, Sunnyvale, CA (US)

( * ) Notice: Subject to any disclaimer, the term of this patent is extended or adjusted under 35 U.S.C. 154(b) by 376 days.

(21) Appl. No.: 11/945,534

(22) Filed: Nov. 27, 2007

(65) Prior Publication Data

US 2009/0138628 A1    May 28, 2009

(51) Int. Cl.
  *G06F 13/28* (2006.01)
  *G06F 13/38* (2006.01)
(52) U.S. Cl.
  CPC .................... *G06F 13/387* (2013.01)
  USPC .......................................................... 710/22
(58) Field of Classification Search
  USPC .......................................................... 710/22
  See application file for complete search history.

(56) References Cited

U.S. PATENT DOCUMENTS

| | | | |
|---|---|---|---|
| 6,653,859 B2* | 11/2003 | Sihlbom et al. ................. | 326/38 |
| 6,816,750 B1* | 11/2004 | Klaas ............................ | 700/121 |
| 7,020,733 B2* | 3/2006 | Kim et al. ...................... | 710/309 |
| 7,093,153 B1* | 8/2006 | Witek et al. ................... | 713/600 |
| 7,171,050 B2* | 1/2007 | Kim .............................. | 382/232 |
| 2005/0144336 A1* | 6/2005 | Lin ................................ | 710/22 |
| 2006/0282233 A1* | 12/2006 | Pasricha et al. ................. | 703/1 |
| 2007/0136503 A1* | 6/2007 | Worrell et al. ................ | 710/240 |
| 2008/0082736 A1* | 4/2008 | Chow et al. ................... | 711/103 |
| 2008/0270650 A1* | 10/2008 | Bracamontes Del Toro . | 710/105 |

* cited by examiner

*Primary Examiner* — Chun-Kuan Lee
(74) *Attorney, Agent, or Firm* — Amin, Turocy & Watson, LLP

(57) ABSTRACT

Systems and methods that can facilitate an expedient and efficient transfer of data between memory components (e.g., flash memory) and host components (e.g., multimedia cards, secure digital cards, etc.) are presented. A memory controller component can be employed to facilitate transferring between the memory components and host components by utilizing a multi-bus architecture. A controller first bus can be utilized for code that can be executed by a controller processor while a controller second bus can be designated for the transfer of data to the mass storage devices. By architecting the memory controller component with two buses, this innovation can provide a higher data throughput than conventional memory controllers.

20 Claims, 9 Drawing Sheets

MULTI-BUS ARCHITECTURE FOR MASS STORAGE SYSTEM-ON-CHIP CONTROLLERS

TECHNICAL FIELD

The subject innovation relates generally to memory systems and in particular, to systems and/or methodologies that can facilitate high throughput data transfers to memory devices.

BACKGROUND

Flash memory is a type of electronic memory media that can be rewritten and can retain content without consumption of power. Flash memory has become popular, at least in part, because it combines the advantages of the high density and low cost of erasable programmable read only memory (EPROM) with the electrical erasability of electronically erasable programmable read only memory (EEPROM). Flash memory is non-volatile; it can be rewritten and can hold its content without power. It can be used in many portable electronic products, such as cell phones, portable computers, voice recorders, thumbnail drives and the like. The fact that flash memory can be rewritten as well as its retention of data without a power source, small size and light weight have all combined to make flash memory devices useful and popular means for transporting and maintaining data.

Often times, data can be transferred from a host device (e.g., memory cards) to a mass storage device (e.g., flash memory). For example, data can be transferred from a multimedia (MMC) or secure digital (SD) card to a mass storage device. The MMC and SD cards can, for example, be used in digital cameras, handheld computers, personal digital assistants (PDAs) and global positioning system devices (GPSs). In another example, data can be transferred between a consumer electronics ATA device (CE-ATA) and a mass storage device, wherein a CE-ATA device can be, for example, a hard drive that can be used to store information for such devices as media players, digital cameras, digital camcorders etc.

The amount of data that can be stored in a host devices and a mass storage device has steadily increased. For example, MMC and SD cards can store data ranging from 8 megabytes (MB) to 8 GB of data or more, while CE-ATA hard drives can potentially store many times that amount of data. As a result of the increased memory capacity of host devices and mass storage devices, there can be an increased demand for a more expedient and efficient means for transferring and controlling the larger amount of information.

Because of the higher storage capabilities associated with host devices (e.g., MMC cards, SD cards, CE-ATA devices) it is desirable to be able to transmit and program to and from these host devices to mass storage devices (e.g., flash memory) with an innovation that can provide high data throughput. Such an innovation could result in higher productivity due, in part, to the decreased amount of time it would take to transfer data between these types of devices.

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

The disclosed subject matter relates to systems and methods that relate to high throughput data transfers between memory components and host components. In particular, the disclosed subject matter can facilitate the expedient and efficient transfer of data between memory components (e.g., flash memory) and host components (e.g., multimedia cards, secure digital cards, etc.) connected to the memory controller are presented. A direct memory access (DMA) component can be employed to facilitate transferring data between the memory components and host components by utilizing a multi-bus architecture. In accordance with one aspect of the disclosed subject matter, a controller first bus can be predominately used for executing code for various processes that can be done by a controller processor while a controller second bus can be controlled via the direct memory access (DMA) component. In accordance with one aspect of the disclosed subject matter, the controller second bus can be predominately used for the transfer of data between memory components and host components connected to the memory controller. By structuring the memory controller component with two buses, this specification can provide a higher data throughput than conventional memory controllers, because data can be transferred between memory components and host components, for example, without having to share a bus with other types of processes that occur within a memory controller.

In accordance with one aspect of the disclosed subject matter, the memory controller can also conserve system power by utilizing the multi-bus architecture. In accordance with one aspect of the disclosed subject matter, the controller first bus can operate at a reduced power setting when code is not being executed on the controller first bus. For example, the DMA component can be independently transferring data between the memory components and the host components on the controller second bus while the controller first bus is powered down and/or operates at a reduced power setting. Likewise, the controller second bus can be powered down and/or in a reduced power state when the controller second bus is not currently being utilized. It is to be appreciated that when the respective buses (e.g., the controller first bus and controller second bus) are powered-down that components associated with the respective buses may also, if possible, be powered-down.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Figure 1:
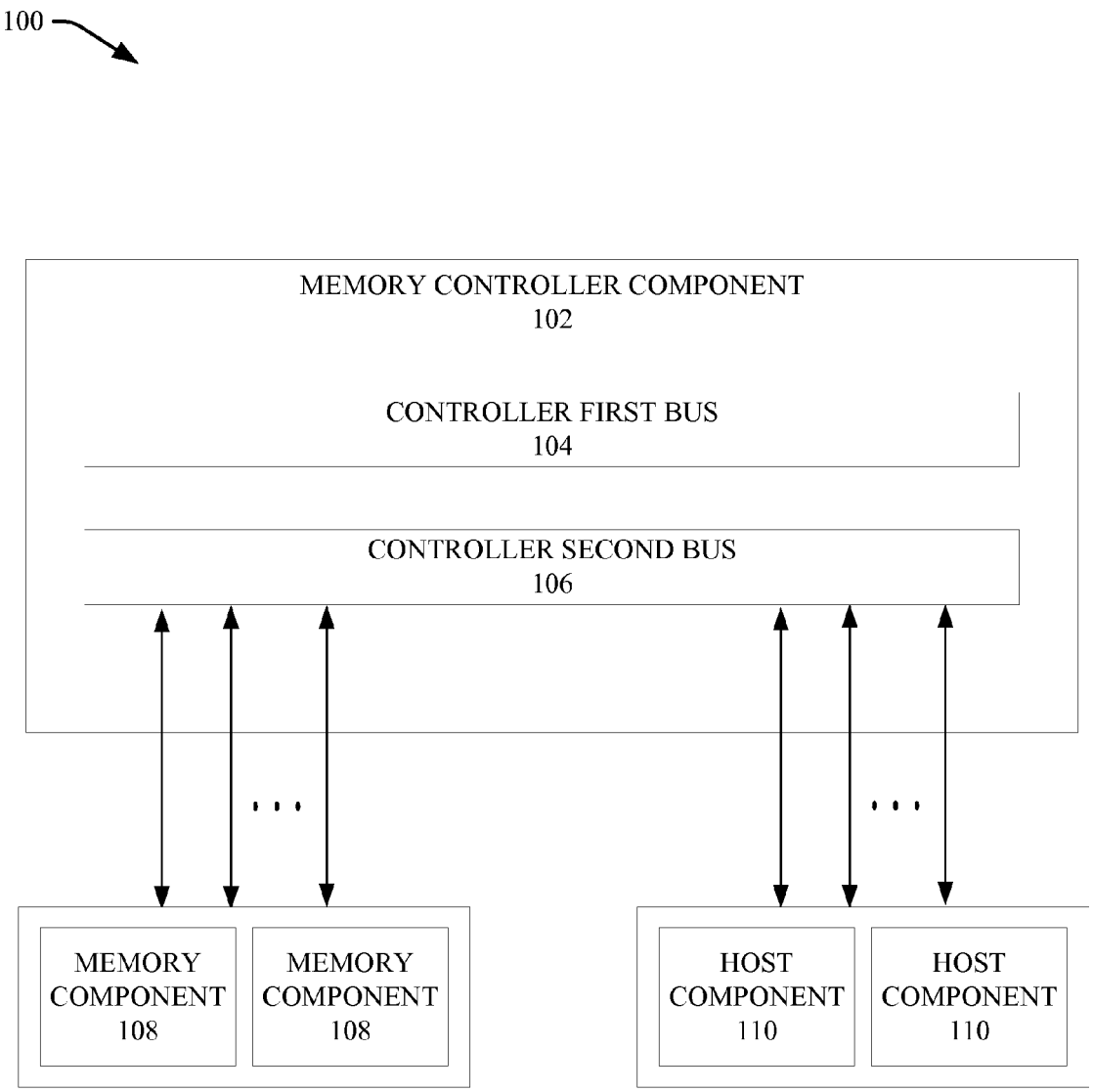
FIG. 1 illustrates a block diagram of a system that facilitates the transfer of data associated with a memory in accordance with an aspect of the subject matter disclosed herein.

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram form in order to facilitate describing the subject innovation.

Today's mass storage devices (e.g., flash memory) can have a memory controller, wherein the memory controller can manage the interface between a mass storage memory and a host component such as, for example, a multimedia card (MMC), secure digital (SD) card, micro SD (microSD) card, and/or consumer electronics ATA (CE-ATA) hard drive devices. Essentially, a memory controller can facilitate file management functions for mass storage devices. Often, memory controllers utilize uni-bus architectures for file management or use multi-bus architectures that may not fully take advantage of multi-bus capabilities. However, it is desirable to improve (e.g., reduce) the amount of time that it takes to transmit data between mass storage components (e.g., flash memory) and host components particularly in view of the steadily increasing amount of data each of these components can store.

It is to be appreciated that a memory controller can be configured to operate after start up by using a processor component that can execute firmware or similar type of code from a non-volatile memory (e.g., read only memory (ROM), flash memory). The processor component can subsequently access the nonvolatile memory or a random access memory (RAM) to obtain further firmware instructions for executing commands. For example, the memory controller can perform such tasks as memory wear leveling (e.g., static wear leveling) and garbage collection to reclaim memory cells within a memory. The disclosed specification contemplates that these types of tasks associated or performed by the memory controller can be performed while data can be simultaneously transferred between the memory components and the host components. For example, the processor component can perform tasks on the controller first bus while data can be transferred between a memory component and a host component on the controller second bus, wherein the controller first bus and the controller second bus can operate independent of each other.

Turning to the figures, FIG. 1 illustrates a system 100 that can facilitate the transmission of data associated with a memory in accordance with an aspect of the disclosed subject matter. The memory controller component 102 can facilitate efficient file/data management through the use of a multi-bus architecture. For example, the multi-bus architecture can facilitate the isolation of code from data within the memory controller 102. In one embodiment, the memory controller component can be comprised, in part, of a controller first bus 104 and a controller second bus 106. In accordance with one aspect of the disclosed subject matter, the memory controller component 102 can facilitate the transfer of executing code on the controller first bus 104. In one aspect, executing code can originate from internal non-volatile memory (not shown) or read only memory (not shown), for example. Executing code can, for example, relate to the operation and maintenance of memory components 108 (e.g., flash memory) such as wear leveling and garbage collecting of memory cells, for example, to reclaim the cells for future use. By isolating code from the data, the subject specification can facilitate high data throughput between the memory components 108 and host components 110 (e.g., MMC, SD cards etc.).

In accordance with one aspect of the disclosed subject matter, the memory controller component 102 can utilize, in part, the controller second bus 106 to facilitate the transfer of data between the memory components 108 and the host components 110. The memory controller component 102 can, for example, receive instructions to transfer data from host components 110 to the memory components 108 via the controller first bus 104. The memory controller component 102 can, based in part on the instructions received on the controller first bus 104, configure the controller second bus 106 to facilitate the independent transfer of data from the host components 110 to the memory components 108. The memory controller component 102 can, for example, utilize the controller first bus 104 for executing firmware instructions while the controller second bus 106 simultaneously transfers the data between the host components 110 and memory components 108. By utilizing this multi-bus architecture, the subject innovation can increase the overall throughput of the data and instruction code (e.g., data that can contain control information) that the memory controller component 102 can process.

It is to be appreciated that the controller first bus 104 and controller second bus 106 can be, for example, comprised of any of several types of bus architectures. These types of bus architectures can include, but are not limited to, Advanced Microcontroller Bus Architecture (AMBA), AXI Bus, and VME bus. It is to also be appreciated that the controller first bus 104 and controller second bus 106 can be, for example, associated with such bus architectures as the Extended ISA (EISA), Industrial Standard Architecture (ISA), Micro-Channel Architecture (MSA), VESA Local Bus (VLB), Card Bus, Universal Serial Bus (USB), Advanced Graphics Port (AGP), Personal Computer Memory Card International Association bus (PCMCIA), Firewire (IEEE 1394), Small Computer Systems Interface (SCSI), Intelligent Drive Electronics (IDE), and Peripheral Component Interconnect (PCI).

System 100 can comprise a plurality of memory components 108. The memory components 108 can be comprised of nonvolatile memory and/or volatile memory, for example. Nonvolatile memory can include, but is not limited to, flash memory (e.g., single-bit flash memory, multi-bit flash memory), mask-programmed ROM, programmable ROM (PROM), Erasable PROM (EPROM), Ultra Violet (UV)-erase EPROM, one-time programmable ROM, and electrically erasable PROM (EEPROM). A flash memory can be comprised of NAND memory and/or NOR memory, for example. Volatile memory can include, but is not limited to, RAM, static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). Each memory component 108 can include a memory array (not shown) comprised of a plurality of memory locations (e.g., memory cells) (not shown) wherein each memory location can store one or more bits of data. Data stored in the memory locations(s) can also be read and such data can be provided as an output.

The memory controller component 102 can interface to the host components 110. The host components 110 can be comprised of at least one data storage device such as, for example, an SD card or MMC. In accordance with one aspect of the disclosed subject matter, the memory controller component 102 can, for example, configure controller second bus 106 to extract data packets from the host components 110 and to store the packets into one or more of the memory (not shown) contained within memory components 108. One advantage of configuring controller second bus 106 to extract and store the packets from the host components 110 is that the controller second bus 106 can independently transfer the packets which can allow other controller functions to be performed on the controller first bus 104.

Figure 2:
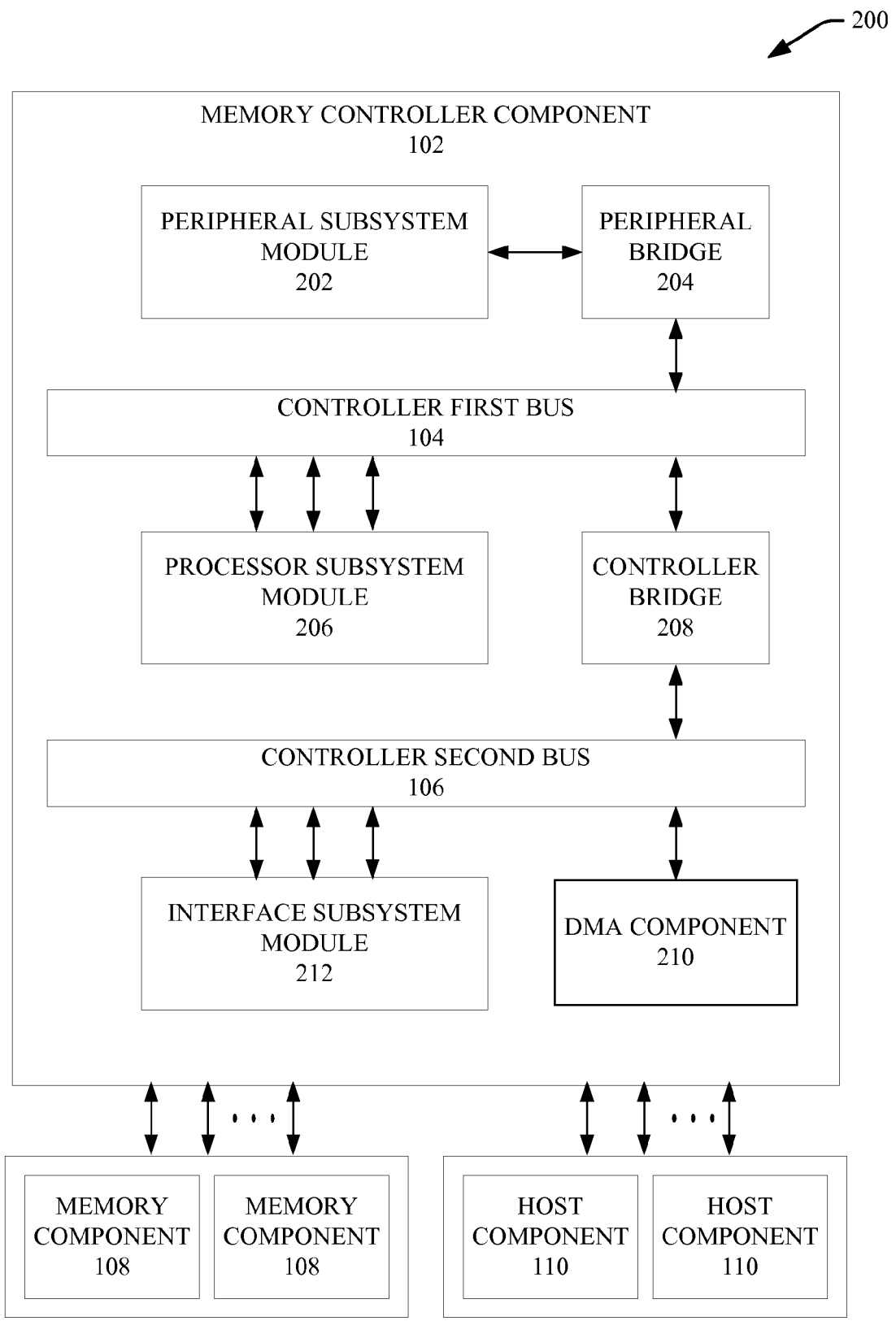
FIG. 2 depicts a block diagram of a system that facilitates controlling data flow associated with a memory in accordance with an aspect of the disclosed subject matter.

Referring to FIG. 2, depicted is a block diagram of a system 200 that can facilitate controlling data flow associated with a memory in accordance with an aspect of the disclosed subject matter. System 200 can include a peripheral subsystem module 202. In accordance with one aspect of the disclosed subject matter, the peripheral subsystem module 202 can, for example, contain peripheral components that can be associated with memory controller component 102 to facilitate secondary data transfer interfaces to the memory controller component 102. In addition, the peripheral subsystem module 202 can facilitate supporting firmware instructions to the memory controller component 102, for example. It is to be appreciated that the peripheral subsystem module 202 can include an internal bus (not shown) to facilitate communication between the internal components of the peripheral subsystem module 202 and the controller first bus 104.

In accordance with one aspect of the disclosed subject matter, the peripheral subsystem module 202 can include, but not limited to, a timer, an interrupt controller, and a general purpose input/output (GPIO) component, for example. For brevity, these internal components of the peripheral subsystem module 202 are not shown; however, the types of components and/or devices found in a peripheral subsystem module and depicted herein are known by those of skill in the art.

In accordance with one aspect of the disclosed subject matter, system 200 can also include a peripheral bridge 204 that can facilitate bridging data and instruction code transfers between the peripheral subsystem module 202 and the controller first bus 104. In one aspect, the peripheral bridge 204 can be an Advanced High-performance Bus (AHB) to Advanced Peripheral Bus (APB) bridge module. For example, in one embodiment of the disclosed subject matter, the controller first bus 104 can be an AHB bus and the peripheral subsystem module 202 internal bus can be an APB bus. In such an embodiment, the peripheral bridge 204 can, for example, translate AHB commands to APB commands. It is to be appreciated that in such an embodiment, APB transactions can, for example, be of a lower speed than that of AHB transactions. Such a configuration can be used to configure internal components within the peripheral subsystem module 202 to facilitate data transfers between the peripheral subsystem module 202 and the controller first bus 104 and associated modules/components connected to the controller first bus 104, for example.

System 200 can also include a processor subsystem module 206 that can be associated with the controller first bus 104. In accordance with one aspect of the disclosed subject matter, the processor subsystem module 206 can control the interface data transfer management of system 200. For example, the processor subsystem module 206 can, facilitate configuring the controller second bus 106 for data transfers between the memory components 108 and host components 110 (e.g., from FIG. 1) via the controller second bus 106. In accordance with one aspect of the disclosed subject matter, the processor subsystem module 206 can also execute firmware code that can be propagated from the peripheral subsystem module 202. The processor subsystem module 206 is further discussed infra in reference to system 300.

For communication between the two bus segments (e.g., controller first bus 104 and controller second bus 106), a controller bridge 208 can be implemented in system 200. In accordance with one aspect of the disclosed subject matter, controller second bus 106 can operate at a faster bus speed than that of controller first bus 104. The faster bus speed can, for example, be implemented on the controller second bus 106 to facilitate higher data transfer speeds between the memory components 108 and host components 110 (e.g., from FIG. 1). If, for example, the chosen bus architecture for the memory controller component 102 is AMBA based, the controller bridge 208 can be an AHB-to-AHB bridge.

To facilitate the configuration of the controller second bus 106 to have independent operation from the controller first bus 104, system 200 can implement the use of a Direct Memory Access (DMA) component 210. A DMA can be implemented in hardware to access memory (e.g., memory components 108, as illustrated in FIG. 1 and described herein) for reading and/or writing independently of a processor component (e.g., a processor such as a processor in the processor subsystem module 206 (not shown, but discussed infra in system 300)). It is to be appreciated that a processor would normally have to dedicate virtually all of its time performing a data transfer during data transfer operations without a DMA. It is to be further appreciated that the implementation of a multi-bus architecture, such as in the disclosed specification, allows for the controller second bus 106 and associated DMA component 210 to operate independently from the controller first bus 104 and the associated processor subsystem module 206. In accordance with one aspect of the disclosed subject matter, the processor subsystem module 206 can configure the DMA component 210 to control (e.g., master) the controller second bus 106, thus freeing the processor subsystem module 206 to send and/or receive data, and/or execute code, via the controller first bus 104.

For example, in accordance with one aspect of the disclosed subject matter, the processor subsystem module 206 can receive execution code to transfer data between memory components 108 and memory components 108. The processor subsystem module 206 can configure the DMA component 210 to facilitate the data transfer that can be accommodated on the controller second bus 106. In accordance with one aspect of the disclosed subject matter, the controller second bus 106 can be configured to operate the highest bus speed possible to achieve optimal (e.g., maximum) data throughput between the memory components 108 and the host components 110, for example.

System 200 can include an interface subsystem module 212 that can facilitate providing interfaces for internal and external memory components (e.g., memory components 108). In accordance with one aspect of the disclosed subject matter, interface subsystem module 212 can, for example, provide interfaces, controls, timing, and error control for the memory components 108 (e.g., from FIG. 1) and host components 110 (e.g., from FIG. 1). The interface subsystem module 212 can also provide a connection to the controller second bus 106 to facilitate DMA control (via the DMA component 210) over the interfaces. In accordance with one aspect of the disclosed subject matter, the controller second bus 106 can be comprised of an AHB bus segment which can facilitate transferring data between at least two interfaces associated with the interface subsystem module 212. An example interface subsystem module 212 and example internal components are discussed infra in FIG. 4.

Figure 3:
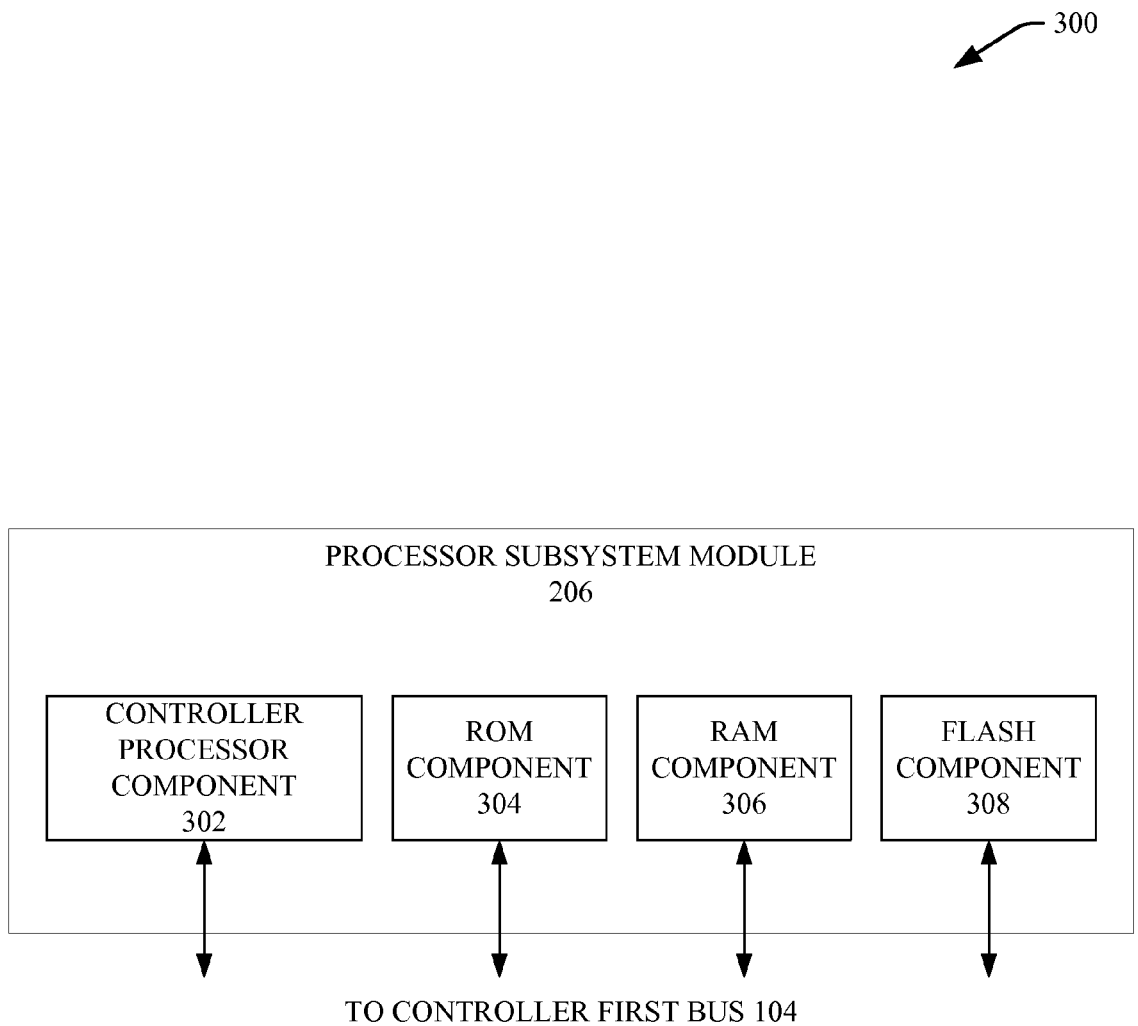
FIG. 3 illustrates a block diagram of a system that can facilitate, in part, the control of data to be transferred into a memory in accordance with an aspect of the subject matter disclosed herein.

Turning to FIG. 3, illustrated is a system 300 that can employ a processor subsystem module 206 to facilitate transferring data in accordance with an embodiment of the disclosed subject matter. The processor subsystem module 206 can facilitate controlling data associated with the controller first bus 104 and the controller second bus 106 of system 200. In one aspect, the processor subsystem module 206 can contain a controller processor component 302. The controller processor component 302 can be, for example, one or more of virtually any type of processor such as, for example, an ARM-brand, MIPS-brand, PowerPC-brand and/or x86 processor. The controller processor component 302 can execute the firmware associated with the memory controller component (e.g., 102 of FIG. 1 and FIG. 2). The firmware can be pre-loaded into a read only memory (ROM) 304, for example. In accordance with one aspect of the disclosed subject matter, the ROM component 304 can be a boot ROM, wherein the controller processor component 302 can fetch (e.g., via the controller first bus 104, as illustrated in Figure and described herein) and execute the code contained within the ROM component 304 when the memory controller component 102 (e.g., as depicted in FIGS. 1 and 2, and described herein) boots.

In one embodiment, system 300 can include a RAM component 306 and a flash component 308. The RAM component 306 can, for example, be used to store data for the controller processor component 302 during code execution, for example. In one aspect, the flash component 308 can store boot-up sequence information for the controller processor component 302, for example. The controller processor component 302 can fetch and execute code from the RAM component 306 and/or a flash component 308, for example. It is to be appreciated that instructions stored in the RAM component 306 and/or the flash component 308 can, for example, be loaded into memory prior to boot-up (e.g., in the first bus flash component) or after boot-up via a peripheral subsystem module (e.g., 202 of FIG. 2).

In accordance with one aspect of the disclosed subject matter, the controller processor component 302 and other associated components within the system 300 can facilitate executing code and determining if a transaction can occur on the controller second bus. If, for example, the processor subsystem module 206 determines that a data transfer can be performed on the controller second bus 106, then the processor subsystem module 206 can configure a DMA (e.g., 210 of FIG. 2) to transfer the data, thus freeing the processor subsystem module 206 to perform other system tasks using the controller first bus (e.g., 104 of FIG. 2), for example.

It is to be appreciated that, the memory components depicted in system 300 are not delimited and are provided as an example in accordance with the disclosed specification. For example, any number of memory devices is contemplated within the disclosed subject matter. It is further contemplated that additional components can be added to the processor subsystem module 206 to facilitate controlling and supporting a multi-bus architecture. For example, a bus monitoring component (not shown) can be added to the processor subsystem module 206 to facilitate determining whether the controller second bus (e.g., 106 of FIG. 1 and FIG. 2) is busy to facilitate determining when the controller second bus (e.g., 106) can be configured for another data transaction.

Figure 4:
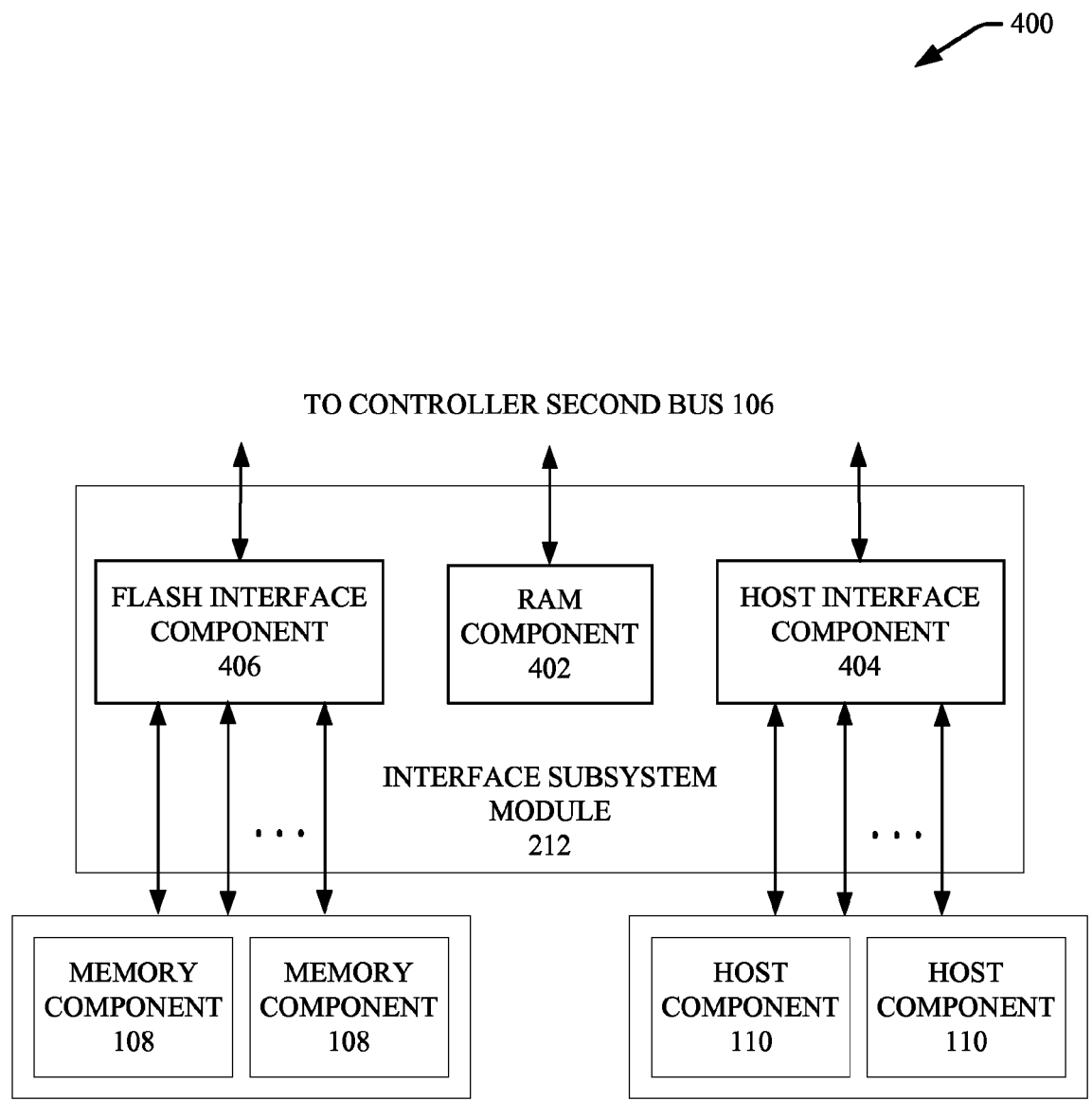
FIG. 4 illustrates a block diagram of a system that can facilitate interfacing memory devices in accordance with an embodiment of the disclosed subject matter.

Referring to FIG. 4 illustrated is system 400 that can facilitate providing interfaces for internal and external memory components in accordance with another embodiment of the disclosed subject matter. In accordance with one aspect of the disclosed subject matter, interface subsystem module 212 can contain a RAM component 402, wherein the RAM component 402 can facilitate the transfer of data between the memory components (e.g., 108 of FIG. 1) and host components (e.g., 110 of FIG. 1). For example, the RAM component 402 can buffer data coming from the host components to facilitate a high data throughput on the controller second bus (e.g., 106 of FIG. 1).

System 400 can also include a host interface component 404, which can provide an interface for the host components. The host interface component can facilitate interfacing with the memory controller component (e.g., 102 of FIG. 1 and FIG. 2) and external host components such as, for example, MMC, SD cards, and CE-ATA drive devices. The host interface component 404 can, for example, extract data from the packets received from the host components and store the data into the RAM component 402. Further, the host interface component 404 can, for example, also convert data being transferred to the host components into respective MMC, SD card, and/or CE-ATA standard formats.

System 400 can also include a flash interface component 406 that can facilitate interfacing the memory controller component 102 to the memory components. The flash interface component 406 can, for example, provide the interface, control, timing and error correction for the memory components 108. It is to be appreciated that the flash interface component 406, the host interface component 404, and the RAM component 402 can also facilitate interfacing to the controller second bus (e.g., controller second bus 106, as depicted in FIG. 1, and described herein). It is to be further appreciated that the DMA component (e.g., 210 of FIG. 2) can also be connected to the controller second bus and can facilitate controlling (e.g., independent from the processor subsystem module (e.g., 206 of FIG. 2) data transfers associated with the flash interface component 406, the RAM component 402, and the host interface component 404, for example.

Figure 5:
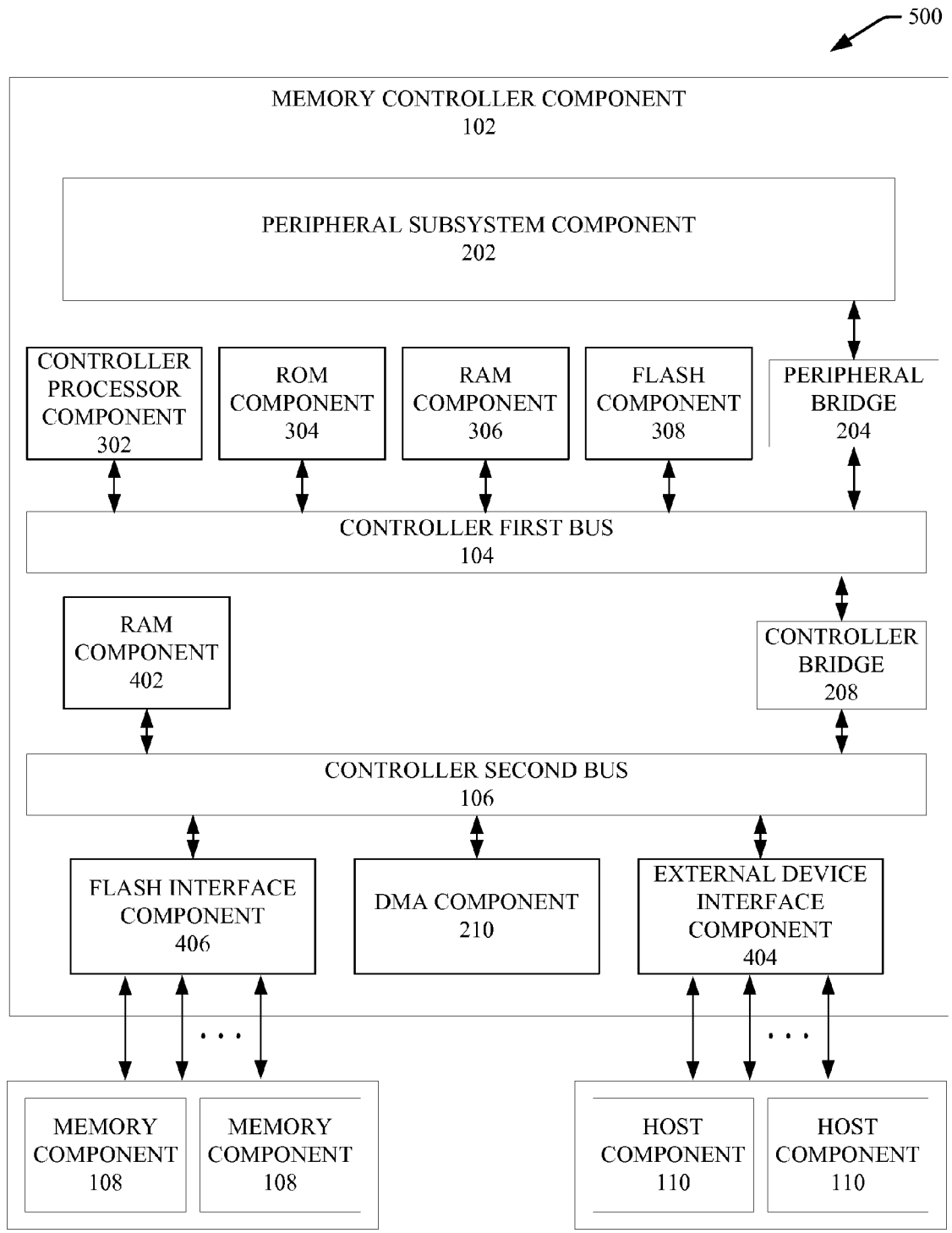
FIG. 5 depicts an example overview system that can facilitate the control of data in accordance with an aspect of the subject matter disclosed herein.

Turning to FIG. 5, depicted is a block diagram of a system 500 that can employ a memory controller component to facilitate control of data transfers associated with a memory component(s) in accordance with an aspect of the disclosed subject matter. In accordance with one aspect, the components depicted in system 500 (e.g., 102, 104, 106, 108, 110, 202, 204, 208, 210, 302, 304, 306, 308, 402, 406, and 408) can be and/or can comprise, and/or can contain the same or similar functionality as, the corresponding components, as described herein, for example, with system 100, system 200, system 300, and system 400.

As described supra (e.g., in system 100), the memory controller component 102 can comprise a multi-bus architecture (e.g., 104 and 106). In accordance with one aspect of the disclosed subject matter, the controller first bus 104 can be predominately used for executing instruction code, wherein the instruction code can relate to the operation and maintenance of various components contained within memory controller component 102. The memory controller component 102 can also utilize the controller second bus 106 to configure the DMA component 210 to facilitate the independent transfer of data between the memory components 108 and the host components 110. By isolating code from data via the multibus structure, the subject specification can facilitate high data throughput between the memory components 108 and host components 110 by configuring the DMA component 210 to control the data flow on the controller second bus 106. By structuring the memory controller component 102 with multiple buses, the disclosed specification can provide a higher data throughput than conventional memory controllers (e.g., uni-bus memory controllers). Also, congestion within the memory controller component 102 can be reduced because the execution code and data transfers can be accommodated on separate busses.

In accordance with one aspect of the disclosed subject matter, the memory controller component 102 can facilitate saving system power. Power can be saved within the memory controller component 102 by operating the bus (e.g., 104 and 106) and respective associated components that are not currently in use at a reduced power-level. For example, during data transfers between host components 110 and memory components 108 wherein the DMA component 210 can control the data flow, the controller first bus 104 and associated components can operate at a reduced power setting, for example. In another example, the controller processor component 302 can execute instruction code and/or transfer data to components (e.g., 108 of system 100, 110 of system 100, 210 of system 200, 304 of system 300, 306 of system 300, 402 of system 400) associated with the controller first bus 104 while no data is being transmitted across controller second bus 106. In such a situation, the memory controller component 102 can reduce the power to the controller second bus 106, as there is no data to transmit via the controller second bus 106.

Figure 6:
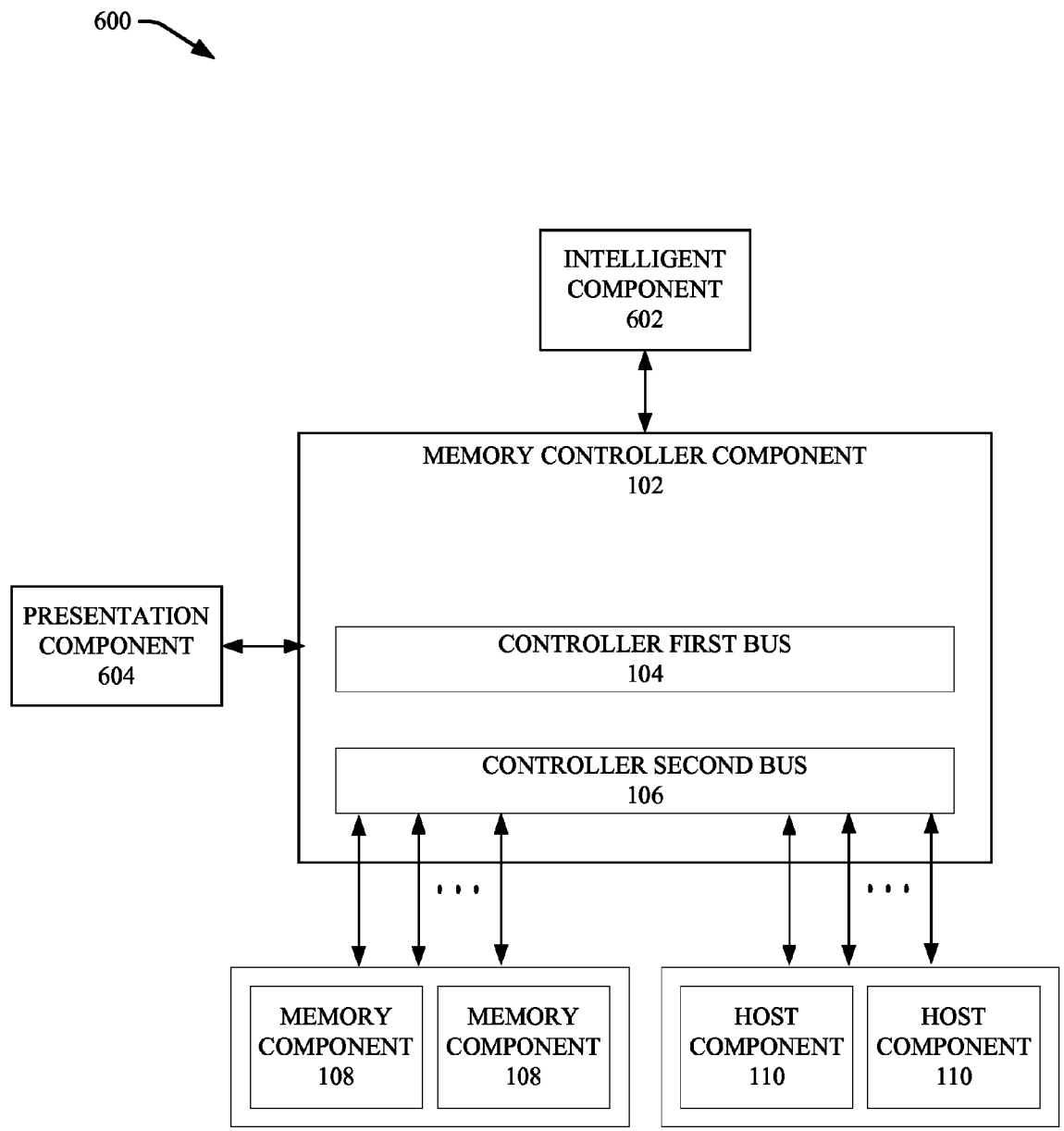
FIG. 6 depicts a block diagram of a system that employs intelligence to facilitate transmission of data associated with a memory component in accordance with an aspect of the disclosed subject matter.

Turning to FIG. 6, depicted is a system 600 that can employ intelligence to facilitate transmission of data associated with a memory component(s) in accordance with an aspect of the disclosed subject matter. System 600 can include a memory controller component 102 that can facilitate efficient data transfers utilizing a multi-bus system (e.g., bus system comprising controller first bus 104 and controller second bus 106) to transfer data between the memory components 108 and host components 110. The memory controller component 102, controller first bus 104, controller second bus 106, memory components 108, and host components 110 each can be substantially similar to respective components and can include such respective functionality as more fully described herein, for example, with regard to system 100, system 200, system 300, system 400, and system 500.

The system 600 can further include an intelligent component 602 that can be associated with the memory controller component 102 and can, for example, reside in a peripheral subsystem module (e.g., 202 of FIG. 2). The intelligent component 602 can analyze data, and based in part on such data, can render an inference(s) and/or a determination(s) regarding a type of host component (e.g., MMC, SD card, CE-ATA storage device etc.) to be utilized with system 600. For example, the intelligent component 602 can evaluate current (e.g., query information) and/or historical information associated with a host component, and based in part on such information and/or predefined criteria, can make an inference as to whether a DMA component (e.g., 210 of FIG. 2) can be configured to allow the data transfer to be handled on the controller second bus. In accordance with one aspect of the disclosed subject matter, the intelligent component 602 can also determine, based on the current and/or historical information associated with a host component, the maximum speed at which the controller second bus 106 can operate to facilitate a the highest possible throughput between the host component 110 and a memory component 108.

As another example, during a program operation, the intelligent component 602 can analyze current and/or historical information associated with the memory components 108 (e.g., flash memory) to be programmed and can infer the amount of time that can be required for a transfer of data between a host component 110 and the memory component 108. The intelligent component 602 can communicate such timing inferences to the memory controller component 102. The memory controller component 102 can use the timing information to facilitate reducing the power to the controller second bus 106 to coincide with the completion of the data transfer between the memory component 108 and the host component 110 has been completed.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

System 600 also can include a presentation component 604 that can present data associated memory controller component 102. Further, the presentation component 604 can present data associated with the memory components 108 and the host components 110, and it can also, for example, present data relating to the status of the controller first bus 104 and controller second bus 106. It is to be appreciated that the presentation component 604 can be incorporated into the memory controller component 102 and/or be a stand-alone unit. The presentation component 604 can provide various types of user interfaces to facilitate interaction between a user and any component coupled to the memory controller component 102.

The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the memory controller component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 7:
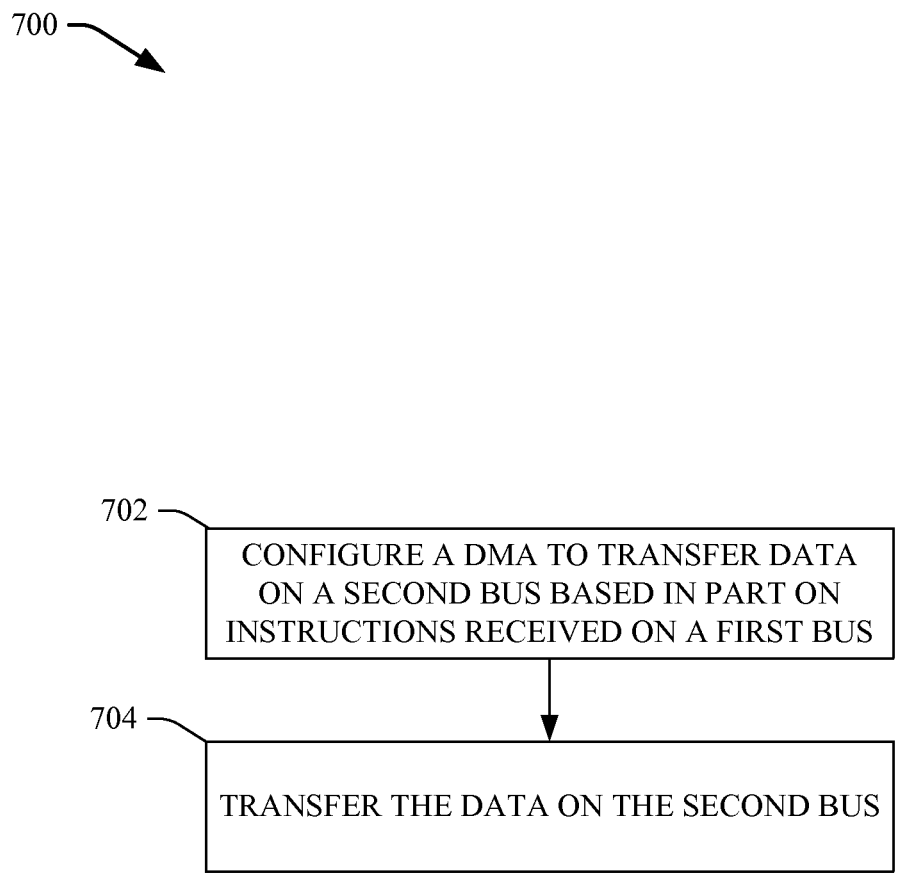
FIG. 7 illustrates a methodology that facilitates configuring a memory control module to transfer data in accordance with an aspect of the disclosed subject matter.
Figure 8:
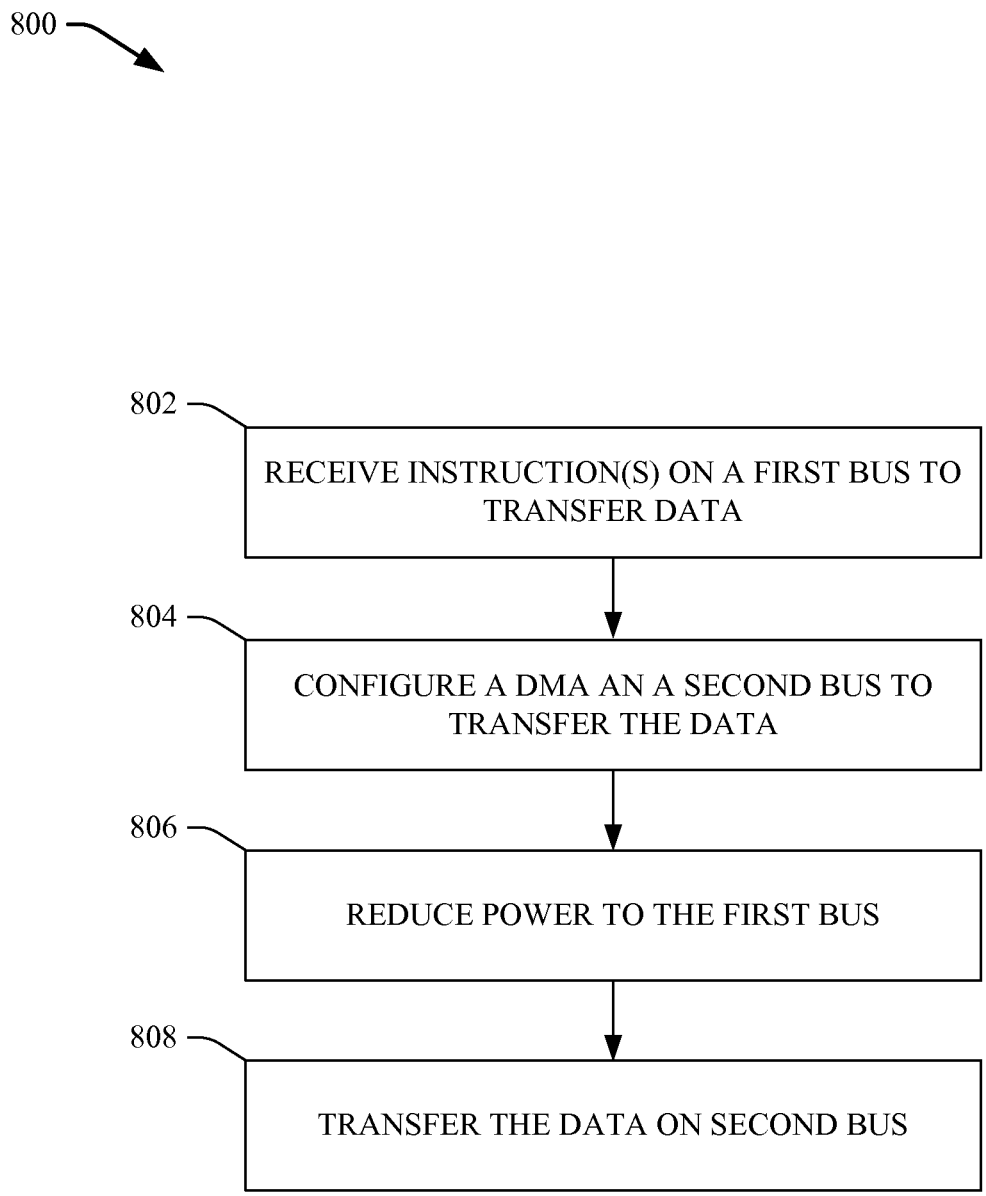
FIG. 8 illustrates a methodology that facilitates configuring a memory control module to transfer data in accordance with an aspect of the disclosed subject matter.
Figure 9:
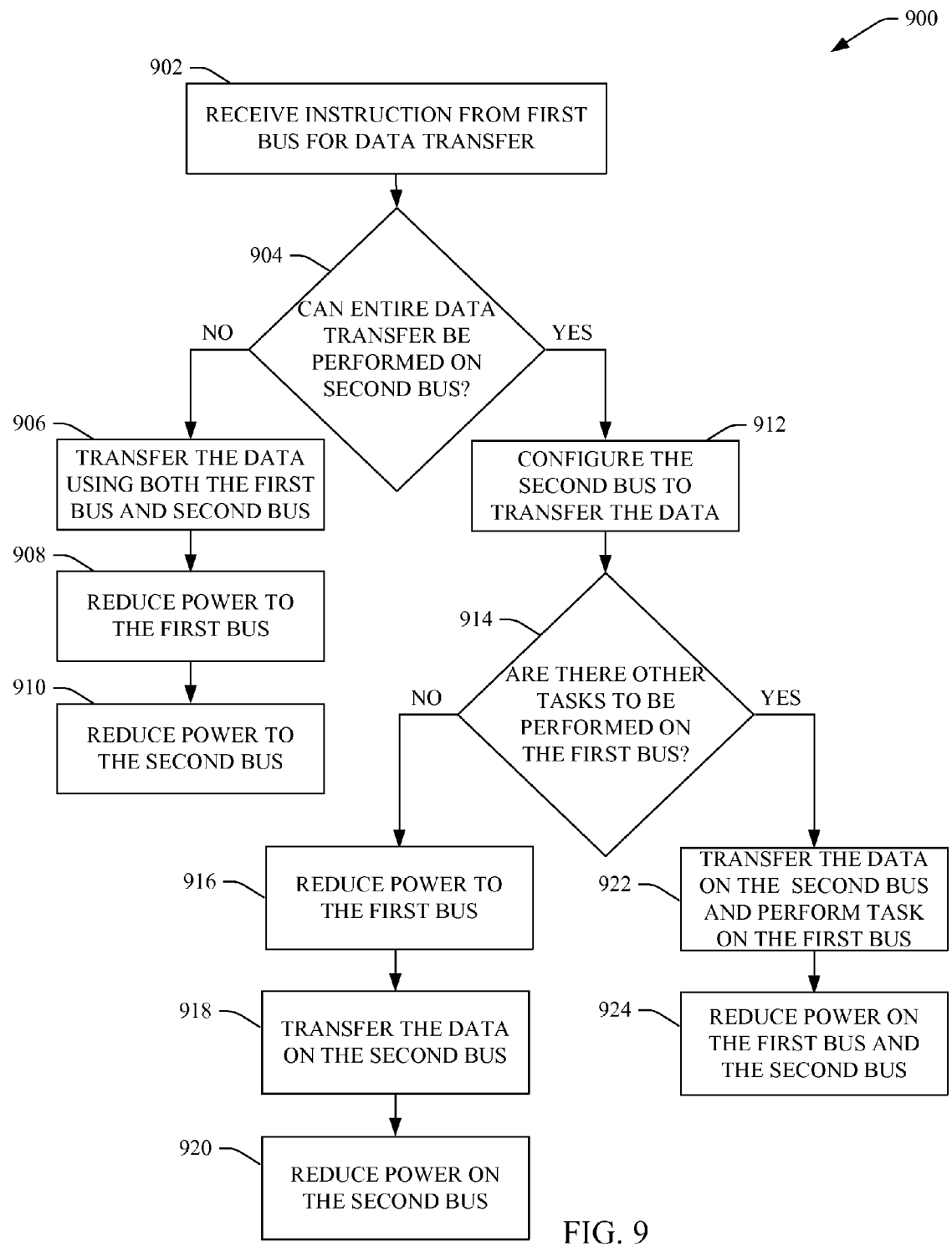
FIG. 9 depicts a methodology that facilitates data transfers associated with a memory component in accordance with an aspect of the disclosed subject matter.

FIGS. 7-9 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring to FIG. 7, a methodology 700 that can facilitate transmitting data in accordance with an aspect of the disclosed subject matter is illustrated. At 702, a DMA can be configured to facilitate the transfer of data on a controller second bus (e.g., 106) based in part on data instructions that can be received on a first bus.

In accordance with one aspect of the disclosed subject matter, a memory controller component (e.g., 102) can receive instructions to fetch a block of code from a memory component (e.g., 108) to be transferred to a host component (e.g., 110). The memory controller component can then configure, via a controller first bus (e.g., 104) and a bus bridge (e.g., 208), a DMA (e.g., 210) to facilitate transferring the data from the memory component to the host component via a controller second bus (e.g., 106). At 704, the data can be transferred via the controller second bus. In one aspect, the DMA can master the controller second bus to facilitate the requested transfer from the memory component to the host component. At this point, methodology 700 can end.

FIG. 8 depicts a methodology 800 that can facilitate transferring data in accordance with an aspect of the disclosed subject matter. At 802, instructions can be received on a controller first bus (e.g., 104) to transfer data. For example, a memory controller component (e.g., 102) can receive an instruction(s) or command(s) from a peripheral subsystem module (e.g., 202) or from an external host interface component (e.g., 404). The instruction(s), for example, can be conveyed to the memory controller component by a controller first bus. In accordance with one aspect of the disclosed subject matter, the instruction(s), for example, can relate to a transfer of data that can take place via a controller second bus (e.g., 106).

At 804, a DMA can be configured to facilitate transferring the data on the controller second bus. For example, a controller processor component (e.g., 302) can facilitate configuring the DMA (e.g., 210) to handle the management of a peripheral subsystem module (e.g., 202) for transferring data on the controller second bus. For instance, the DMA can be programmed with the address of a host interface component (e.g., 404) associated with corresponding external host component (e.g., 110) that is to send or receive data. Additionally, the DMA can be programmed with the address of a flash interface component (e.g., 406) associated with a corresponding external memory component (e.g., 108) that is to send or receive the data. In accordance with one aspect of the disclosed subject matter, the DMA can also be programmed with the amount of data that is to be transferred between the memory component and host component. The amount of data associated with a transfer can come from a processor (e.g., 302), ROM (e.g., 304), the host component, or any combination thereof, for example.

At 806, the power to the controller first bus can be reduced. At this point in methodology 800, the DMA can have all of the information necessary to transfer the data on the controller second bus 106. In accordance with one aspect of the disclosed subject matter, when the controller first bus and components associated with the controller first bus do not have any further information to transfer, after a predetermined period of time of inactivity, the controller first bus and associated components can be configured to run at a reduced power setting. For example, the processor (e.g., 302) associated with a processor subsystem module (e.g., 206) can be set to a low power consumption mode. Likewise, the bridging components (e.g., 204 and 208) associated with the controller first bus can be powered-down as well.

At 808, the DMA can facilitate transferring the data on the controller second bus. In accordance with one aspect of the disclosed subject matter, the DMA can transfer the data in accordance with configuration information, for example, as received at reference 806. At this point the controller second bus and associated components (e.g., 210 and 212) can operate at a desired and/or optimal (e.g., maximum frequency or power) while the controller first bus and associated components can remain in a powered down and/or reduced power state. In one aspect, the DMA can retain control of the controller second bus through the duration of the data transfer. Once the DMA component 210 finishes transferring the data, the data transfer on the controller second bus can be complete. At this point, methodology 800 can end.

FIG. 9 depicts a methodology 900 that can facilitate the programming of data associated with a memory component(s) in accordance with an aspect of the disclosed subject matter. At 902, instructions can be received on a controller first bus (e.g., 104) to transfer data. In accordance with one aspect of the disclosed subject matter, a controller processor component (e.g., 302) can receive execution code from a peripheral subsystem module (e.g., 202) or a ROM (e.g., 304), for example. In accordance with another aspect, the execution code can relate to instructions associated with data transfers that can be facilitated via a controller first bus (e.g., 104) and/or via a controller second bus (e.g., 106). For example, the execution code can be associated with transmitting data from a peripheral subsystem module (e.g., 202) to a RAM component (e.g., 306). In another example, the execution code can be associated with a data transfer from a controller processor component (e.g., 302) the peripheral subsystem module. In both of these examples, only the use of the controller first bus and the associated bridge (e.g., 204) is needed for the data transfer.

At 904, a determination can be made as to whether a given data can be transferred exclusively on the controller second bus. In accordance with one aspect of the disclosed subject matter, the controller processor component can make the determination based in part on the type of data transition that is to occur. In one aspect, it can be determined that the execution code relates to a data transfer that can traverse both the first and controller second bus. For example, the execution code can be associated with transferring data from a ROM (e.g., 304) to an external flash memory device (e.g., 108). In such case, the data can be transferred via the controller first bus, the controller second bus, and/or any associated bridges connecting the two busses (e.g., 208).

If, at 904, a determination is made that the execution code relates to a data transfer that can not entirely be transferred on the controller second bus, at 906, the data can be transferred using both the controller first bus and the controller second bus. In accordance with one aspect, the processor can facilitate transferring the data without utilizing the DMA. For example, the processor can, based in part on the execution code, fetch data from the peripheral subsystem module (e.g., 202) to be transferred to an external memory component (e.g., flash memory) connected to the controller second bus. Such a transaction, for example, can utilize both the controller first bus and the controller second bus, and each respective bus can remain fully powered during this type of data transfer. It is to be appreciated that the processor can also facilitate controlling the data flow, based in part on the execution code, between a host component and a memory component without utilizing the DMA as well thus utilizing both the controller first bus and the controller second bus.

After the data is transferred using both the controller first bus and the controller second bus, at 908, the controller first bus can be operated at a reduced power setting. For instance, after the data is transferred using both the controller first bus and the controller second bus, the power associated with the controller first bus can be reduced to a predetermined reduced-power setting. Similarly, at 910, the controller second bus can be operated at a reduced power setting.

Returning back to reference number 904, if it was determined that the entire data transfer can be performed on the controller second bus, at 912, the controller second bus can be configured to handle the data transfer. In accordance with one aspect of the disclosed subject matter, the controller processor component (e.g., 302) can program a DMA component (e.g., 210) to process the data transfer based in part on the execution code the DMA component received for the data transfer. For example, the execution code can request a data transfer to be made between a memory component (e.g., 108) and host component (110).

Once the DMA component is configured to handle the data transaction between the memory component and host component, at 914, it can be determined whether a pending data transaction(s) can be performed on the controller first bus. If there is no pending transaction that can be performed on the controller first bus, at 916, the power to the controller first bus can be reduced to a predetermined reduced-power setting. It is to be appreciated that the components associated with the controller first bus can also be powered down.

At 918, the DMA can commence transferring the data on the controller second bus. For example, the DMA can communicate the data via a flash interface component (e.g., 406) and a host interface component (e.g., 404) to facilitate the transfer of data between an external or internal memory component and an external or internal host component.

At 920, the power can be reduced to the controller second bus. In accordance with one aspect of the disclosed subject matter, the DMA component, in conjunction with the controller processor component (e.g., 302), for example, can facilitate reducing the power to the controller second bus and its associated components to respective predetermined reduced-power settings. Returning back to reference 914, if it was determined that there is a pending task(s) that can be performed on the controller first bus, at 922, the DMA can control the transfer of data on the controller second bus. In accordance with one aspect, other tasks, such as, for example, executing code, wear leveling of internal flash (e.g., 308), and garbage collection tasks, can be simultaneously performed using the controller first bus. For example, the controller processor component can process execution code instructions received from a peripheral subsystem module (e.g., 202) via the controller first bus while the DMA controls the flow of data on the controller second bus. In a conventional system, the additional tasks performed by the processor would interrupt the dataflow between the memory component and host component (e.g., the processor would only perform one task at a time and a single bus can perform only one transaction at a time). However, in the subject innovation, the transfer of data between the memory component and host component can continue uninterrupted because of the multi-bus architecture of the memory controller component (e.g., 102) can facilitate uninterrupted data transfers via the controller second bus utilizing the DMA component to facilitate controlling data flow on the controller second bus, and the host component can perform other tasks via the controller first bus. The uninterrupted data flow between the memory component and host component can thus result in higher data throughput as compared to the conventional memory controllers (e.g., uni-bus memory controllers). For example, conventional memory controller components can achieve data throughput levels in the range of 10 to 15 Megabytes (MB)/sec, while the multi-bus architecture of the subject innovation can achieve data throughputs up to and surpassing 50 MB/sec, for example. Also, congestion within a memory controller can be relieved because the execution code and data transfers can be accommodated on separate busses.

At 924, the power to both the controller first bus and the controller second bus along with the associated respective components can operate at a predetermined reduced power setting to conserve power.

As utilized herein, terms "component," "system," "interface," and the like, are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system that transfers data between at least one host component and at least one memory component, comprising:
   a memory controller, wherein the memory controller comprises:
      a controller processor,
      a controller first bus that is configured to transfer at least instruction code for the controller processor, wherein at least a portion of the instruction code is used to perform one or more memory-maintenance operations on one or more memory cells in the at least one memory component, and wherein the controller first bus is communicatively connected to the at least one host component and the at least one memory component, and
      a controller second bus that is configured to transfer at least a portion of data associated with a data transaction between the at least one host component and the at least one memory component,
      wherein the controller second bus is communicatively connected to the at least one host component and the at least one memory component,
      wherein transfer of the at least the portion of the data via the controller second bus is independent from transfer of the instruction code via the controller first bus,
      wherein the controller processor is further configured to determine whether the controller second bus is able to transfer all of the data associated with the data transaction, and, in response to the controller processor determining that not all of the data associated with the data transaction is able to be transferred via the controller second bus, the controller processor facilitates transfer of a first portion of the data associated with the data transaction between the at least one host component and the at least one memory component and the transfer of the instruction code via the controller first bus at a same time as transfer of a second portion of the data associated with the data transaction via the controller second bus, to transfer the data associated with the data transaction simultaneously with the performance of the one or more memory-maintenance operations on the one or more memory cells, and wherein, in connection with the data transaction, the controller processor is further configured to facilitate determining whether the controller second bus is available to perform another data transaction to facilitate determining whether the controller second bus is to be configured to perform the other data transaction;

a direct memory access (DMA) component that is connected to the controller second bus, wherein the controller processor is further configured to configure the direct memory access component to control the transfer of the at least the portion of the data via the controller second bus based at least in part on at least one other portion of the instruction code, wherein the controller first bus is configured to transfer the at least the portion of the instruction code to perform the one or more memory-maintenance operations on the one or more memory cells at the same time the controller second bus transfers the at least the portion of the data, and wherein the DMA component controls the transfer of the at least the portion of the data associated with the data transaction between the at least one host component and the at least one memory component via the controller second bus such that the transfer of the at least the portion of the data is performed without interruption; and the at least one memory component is communicatively coupled to the memory controller.

2. The system of claim 1, wherein the one or more memory-maintenance operations comprising at least one of a wear leveling operation or a garbage collection operation.

3. The system of claim 2, wherein the at least one memory component is a first memory component, and wherein the controller first bus is configured to transfer the at least the portion of the instruction code to facilitate performance of the one or more memory-maintenance operations on the one or more memory cells of the first memory component at the same time the controller second bus transfers the at least the portion of the data associated with the data transaction associated with the first memory component.

4. The system of claim 1, wherein, in response to the controller processor determining that not all of the data associated with the data transaction is able to be transferred via the controller second bus, the controller processor facilitates transfer of the first portion of the data and the at least the portion of the instruction code via the controller first bus at the same time as transfer of the second portion of the data via the controller second bus to facilitate simultaneous performance of the transfer of data associated with the data transaction and the performance of the one or more memory-maintenance operations, and wherein the DMA controller facilitates transfer of at least a portion of the second portion of the data via the controller second bus.

5. The system of claim 1, further comprising:
a peripheral subsystem module, wherein the peripheral subsystem module is configured to provide a data interface to the memory controller;
a peripheral bus associated with the peripheral subsystem module; and
a peripheral bridge, wherein the peripheral bridge is configured to connect the peripheral bus to the controller first bus.

6. The system of claim 1, wherein the controller first bus is configured to operate at a different frequency than the controller second bus.

7. The system of claim 1, wherein the at least one host component is a multimedia card, a secure digital card, or a consumer electric ATA drive device.

8. The system of claim 1, wherein the at least one memory component is at least one of flash memory, mask-programmed read only memory, programmable read only memory, erasable programmable read only memory, ultra-violet-erase erasable programmable read only memory, one-time programmable read only memory, or electrically erasable programmable read only memory.

9. The system of claim 1, wherein the at least one memory component is associated with at least one of a smart card, a computer, a laptop computer, network equipment, a media player, a media recorder, a television, a phone, a cellular phone, a smart phone, an electronic organizer, a personal digital assistant, a portable email reader, a digital camera, an electronic game, an electronic device associated with digital rights management, a personal computer memory card international association card, a trusted platform module, a hardware security module, a set-top box, a digital video recorder, a gaming console, a navigation system, a secure memory device with computational capabilities, a device with at least one tamper-resistant chip, an electronic device associated with industrial control systems, or an embedded computer in a machine, wherein the machine comprises one of an airplane, a copier, a motor vehicle, or a microwave oven.

10. The system of claim 1, wherein at least one of the controller first bus or at least one component associated therewith is configured to operate at a lower power setting during times of inactivity of the controller first bus as compared to power setting when active, wherein at least one of the controller second bus or at least one component associated therewith, is configured to operate at a lower power setting during times of inactivity of the controller second bus as compared to power setting when active, based at least in part on an inferred time of completion of the transfer of the instruction code or the transfer of the data via the controller first bus or the controller second bus.

11. The system of claim 1, further comprising an intelligent component that is configured to predict a length of time for transferal of the at least the portion of the data via the controller second bus based at least in part on data transfer times associated with past data transfers.

12. The system of claim 1, wherein the memory controller is further configured to utilize the controller first bus to execute firmware instructions associated with the at least one memory component.

13. A method that facilitates controlling data transfers, comprising:
transferring instruction code to a controller processor via a controller first bus that is communicatively connected to a host component and a memory, wherein at least a portion of the instruction code is used to perform one or more memory-maintenance operations on one or more memory locations in the memory;
determining whether a controller second bus is able to transfer all of the data associated with a data transfer between the host component and the memory;
configuring a direct memory access (DMA) component to control at least a portion of the data transfer via the controller second bus based at least in part on at least one other portion of the instruction code at least in response to determining that the controller second bus is able to transfer all of the data associated with the data transfer;

transferring at least a portion of the data associated with the data transfer via the controller second bus based at least in part on the at least one other portion of the instruction code, wherein the controller second bus is independent from the controller first bus;

transferring at least one other portion of the data associated with the data transfer, in addition to the instruction code, via the controller first bus in response to determining that the controller second bus is not able to transfer all of the data associated with the data transfer;

controlling the transfer of the at least the portion of the data associated with the data transfer via the controller second bus to transfer the at least the portion of the data without interruption;

performing the one or more memory-maintenance operations on the one or more memory locations via the controller first bus simultaneously with the transferring of the at least the portion of that data via the controller second bus;

in connection with the data transfer, facilitating determining whether the controller second bus is available to perform another data transfer between the host component and the memory to facilitate determining whether the controller second bus is to be configured to perform the other data transfer; and scheduling a reduction of power of the controller second bus to occur at the completion time to facilitate reducing power consumption by the controller second bus during a time period the controller second bus is not transferring data.

14. The method of claim 13, further comprising:
transferring at least one of a first set of data or a first set of instruction code via the controller first bus; and
transferring at least one of a second set of data or a second set of instruction code via the controller second bus, wherein transferring the first set of data or the first set of instruction code via the controller first bus and transferring the second set of data or the second set of instruction code via the controller second bus occurs simultaneously.

15. The method of claim 13, further comprising:
reducing power of the controller first bus to a predetermined power setting when the controller first bus is inactive; and
reducing power of the controller second bus to a predetermined power setting at the same time the controller second bus completes transferring the at least the portion of the data, wherein the reducing the power of the controller second bus is timed to coincide with completing the transfer of the at least the portion of the data based in part on an inferred duration of data transfer that indicates the completion time of the transfer of the at least the portion of the data.

16. The method of claim 13, further comprising:
determining whether the data is able to be entirely transferred via the controller second bus; and
at least one of:
transferring the data across both the controller first bus and the controller second bus in response to determining that the data is not able to be entirely transferred via the controller second bus;
reducing the power to the controller first bus; and
reducing the power to the controller second bus,
or
determining whether another task is able to be performed by the controller first bus in response to determining that the data is able to be entirely transferred via the controller second bus; and
at least one of:
reducing the power to the controller first bus in response to determining that the other task is not able to be performed by the controller first bus;
transferring the data via the controller second bus; and
reducing power on the controller second bus,
or
transferring the data via the controller second bus;
performing the other task using the controller first bus in response to determining that the other task is able to be performed by the controller first bus;
reducing power to the controller first bus; and
reducing power to the controller second bus.

17. The method of claim 13, further comprising:
capturing observations of events or data relating to the controller second bus to form a state of the controller second bus;
generating a probability distribution based at least in part on the state of the controller second bus, wherein at least one of a support vector machine, neural network, expert system, Bayesian belief network, fuzzy logic method, or data fusion engine is utilized to generate the probability distribution; and
making a prediction of a length of time for the controller second bus to transfer the at least the portion of the data based at least in part on the probability distribution.

18. A system for controlling data, comprising:
means for determining whether a controller second bus is able to transfer all data associated with the data transaction between a host component and a memory;
means for transferring at least one of a first set of data associated with the data transaction or a first set of instruction code via a controller first bus that is connected to the host component and the memory, wherein at least a portion of the first set of instruction code is used to perform at least one memory-maintenance operation on at least one memory cell in the memory;
means for configuring the controller second bus with a processor subsystem that executes at least one other portion of the first set of instruction code to transfer at least one of the first set of data, a second set of data associated with the data transaction, or a second set of instruction code, wherein the processor subsystem is communicatively coupled to the controller first bus;
means for performing the at least one memory-maintenance operation on the at least one memory cell based at least in part on the transferring of the at least the portion of the first set of instruction code via the controller first bus;
means for transferring the at least one of the first set of data, the second set of data or the second set of instruction code via the controller second bus, wherein the transferring of the at least one of the first set of data or the first set of instruction code via the controller first bus occurs at a same time as the transferring of the at least one of the first set of data, the second set of data or the second set of instruction code via the controller second bus, wherein the first set of data and the second set of data are transferred via the controller second bus in response to determining that the controller second bus is able to transfer all of the data associated with the data transaction, and wherein the first set of data is transferred via the controller first bus in response to determining that the controller second bus is not able to transfer all of the data associated with the data transaction, wherein the transferring of the first set of data or the second set of data is performed simultaneously with the performing of the at least one memory-maintenance operation on the at least one memory cell;

means for controlling the transferring of the first set of data or the second set of data via the controller second bus to transfer the first set of data or the second set of data without interruption;

means for determining whether the controller second bus is available to perform another data transaction between the host component and the memory, in relation to a status of the data transaction, to facilitate determining whether the controller second bus is to be configured to perform the other data transfer; and means for scheduling a reduction of power of the controller second bus to occur at the completion time to facilitate reducing power consumption by the controller second bus during a time period the controller second bus is not transferring data.

19. The system of claim 18, further comprising:

means for operating the controller first bus, at least one component associated with the controller first bus, or combination thereof, at a predetermined first reduced power level during times of inactivity of the controller first bus as compared to a first higher power level employed when the controller first bus is active; and means for operating the controller second bus, at least one component associated with the controller second bus, or combination thereof, at a predetermined second reduced power level during times of inactivity of the controller second bus as compared to a second higher power level employed when the controller second bus is active.

20. The system of claim 18, further comprising:

means for reducing power to the controller second bus at the same time the transferring of the second set of data or second set of instruction code is complete.

* * * * *